(12) United States Patent
Takasu et al.

(10) Patent No.: US 7,524,554 B2
(45) Date of Patent: Apr. 28, 2009

(54) SYNTHETIC BOARD AND METHOD OF PRODUCING THE SAME

(75) Inventors: Yasuo Takasu, Nishio (JP); Isoko Takahashi, Hazu-gun (JP); Isamu Terasawa, Toyota (JP); Junichi Noguchi, Okazaki (JP); Kazunori Tsuneoka, Obu (JP)

(73) Assignees: Mitsubishi Jidosha Kogyo Kabushiki Kaisha, Tokyo (JP); Aichi Prefecture, Nagoya-Shi (JP)

( * ) Notice: Subject to any disclaimer, the term of this patent is extended or adjusted under 35 U.S.C. 154(b) by 0 days.

(21) Appl. No.: 11/735,358

(22) Filed: Apr. 13, 2007

(65) Prior Publication Data
US 2007/0243782 A1    Oct. 18, 2007

Related U.S. Application Data

(60) Provisional application No. 60/791,910, filed on Apr. 14, 2006.

(51) Int. Cl.
  *B32B 21/02*    (2006.01)
  *B32B 5/24*    (2006.01)
  *B29C 65/00*    (2006.01)

(52) U.S. Cl. .............. 428/292.4; 442/374; 156/349; 156/405.1

(58) Field of Classification Search ............... 442/374; 428/292.4
  See application file for complete search history.

(56) References Cited

U.S. PATENT DOCUMENTS 6,468,645 B1 * 10/2002 Clausi ................ 428/308.8

FOREIGN PATENT DOCUMENTS

| JP | 9-39127 A | | 2/1997 |
|---|---|---|---|
| JP | 2001-1318 A | | 1/2001 |
| JP | 2004082706 A | * | 6/2002 |
| JP | 2004-181773 | | 2/2004 |
| JP | 2004-188874 | | 8/2004 |
| JP | 2004-074485 | | 11/2004 |

* cited by examiner

*Primary Examiner*—Lynda Salvatore
(74) *Attorney, Agent, or Firm*—Birch, Stewart, Kolasch & Birch, LLP

(57) ABSTRACT

A method of producing a synthetic board involves the step of heat-pressing a mixture. The mixture includes lignocellulosic material containing lignocellulose and polybutylene succinate-based resin serving as an adhesive.

11 Claims, 6 Drawing Sheets

| ITEM | VOLATILE AMOUNT (mg) | | | THREE-DIMENSIONAL MOLDABILITY | WATER ABSORPTION (%) | BENDING STRENGTH (N/mm²) |
|---|---|---|---|---|---|---|
| | TVOC | FORM-ALDEHYDE | ACET-ALDEHYDE | | | |
| EMBODIMENTS 1 AND 4 | 3.8 | 0.09 | 0.20 | GOOD | 12 | 52 |
| EMBODIMENTS 2 AND 5 | 2.8 | 0.07 | 0.15 | GOOD | 15 | 50 |
| EMBODIMENTS 3 AND 6 | 4.0 | 0.13 | 0.18 | GOOD | 18 | 40 |
| COMPARATIVE EXAMPLES 1 AND 2 | 22.7 | 0.86 | 0.86 | POOR | 22 | 41 |

FIG. 9

| ITEM | ADHESION PROPERTY OF NONWOVEN FABRIC | LAMINATION OF NONWOVEN FABRIC AT THE TIME OF MOLDING A SYNTHETIC BOARD |
|---|---|---|
| EMBODIMENT 4 | FRACTURE OF NONWOVEN FABRIC | GOOD |
| EMBODIMENT 5 | FRACTURE OF NONWOVEN FABRIC | GOOD |
| EMBODIMENT 6 | FRACTURE OF NONWOVEN FABRIC | GOOD |
| COMPARATIVE EXAMPLE 2 | FRACTURE OF SYNTHETIC BOARD | POOR |

SYNTHETIC BOARD AND METHOD OF PRODUCING THE SAME

BACKGROUND OF THE INVENTION

1. Field of the Invention

The present invention relates to a synthetic board and a method of producing the same.

2. Description of the Related Art

A synthetic board used for an interior member of a vehicle, a building component and the like includes woody material, such as woodchips and wood fibers, and an adhesive for binding the woody material. The method of producing a synthetic board of this type has the step of mixing the woody materials with an adhesive and the step of molding an obtained mixture.

As an adhesive for a synthetic board, a phenol resin or the like has conventionally been used. However, when a synthetic board containing an oil-derived synthetic resin is burnt, there generates carbon dioxide, and this increases the amount of carbon dioxide in the earth's atmosphere. In addition, the phenol resin contains free phenol and formaldehyde, which have the possibility to make negative effects on the human body.

Given this situation, the method of producing a synthetic board that is free of an oil-derived synthetic resin has been developed. According to the method of producing a synthetic board, which is disclosed in Unexamined Japanese Patent Application Publication No. 2001-1318, lignocellulosic material is subjected to steam treatment. The steam-treated lignocellulosic material is heat-pressed, and is then molded into a synthetic board. In this producing method, hemicellulose that is a component of lignocellulose is hydrolyzed by the steam treatment, and the lignocellulosic material is bound through the hydrolysate of the hemicellulose.

Being made of plant-derived materials alone, the synthetic board disclosed in the above document is environmentally friendly. That is to say, the amount of the carbon dioxide that is discharged when the synthetic board is burnt and the amount of the carbon dioxide that is absorbed when the plants grow set off each other. Therefore, this synthetic board does not increase the amount of carbon dioxide in the earth's atmosphere. In addition, the synthetic board scarcely contains substances that have effects on the human body.

The producing method described in the above publication, however, requires heat press to be carried out at high temperature and pressure for long hours as compared to the case in which an oil-derived synthetic resin is mixed as an adhesive. There also is the problem that the synthetic board thus obtained is inferior in strength to the synthetic board produced by mixing the oil-derived synthetic resin, and is inadequate for the use as an interior member of a vehicle or a building component.

The synthetic board that has recently been developed contains as an adhesive a plant-derived resin such as polylactic acid resin instead of an oil-derived synthetic resin. However, the polylactic acid resin is inferior in flexibility and is brittle. Moreover, the polylactic acid resin is also hard to handle as it is hydrolyzed or biodegraded during use.

Unexamined Japanese Patent Application Publication No. H09-39127 discloses a fabric covered synthetic board as an interior material. The fabric covered synthetic board includes a synthetic board and a woven or nonwoven fabric laminated onto the surface of the board. The step of laminating the fabric onto the synthetic board includes the application of an adhesive to the surface of the synthetic board, disposition of the fabric on the surface, and a process of pressing the fabric and the synthetic board. Such a step incurs an increase in manufacturing cost of fabric covered synthetic boards because of the use of the adhesive, addition of the pressing process, etc. In this step, a solvent adhesive or the like is generally used as an adhesive. The solvent adhesive contains, for example, chloroprene rubber as an adhesive component, and also contains as solvent an organic solvent, such as acetone, toluene and n-hexane. A large quantity of organic solvent has the possibility to make negative effects on the human body, so that the content of the organic solvent must be controlled when the organic solvent is contained in the fabric covered synthetic boards to be used for vehicles and buildings.

SUMMARY OF THE INVENTION

The present invention has been made to solve the above-mentioned problems. It is an object of the invention to provide a synthetic board that is environment- and human-friendly and has sufficient flexibility and strength at the same time.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
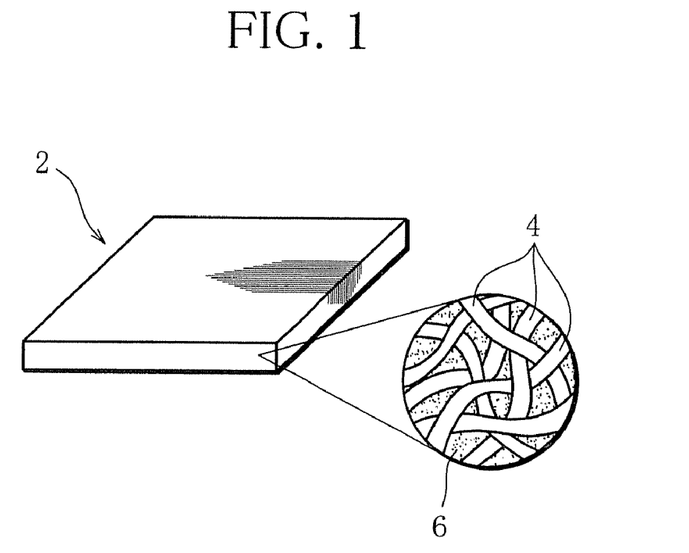
FIG. 1 is a perspective view of a synthetic board of a first embodiment according to the present invention, and a part of the synthetic board is diagrammatically shown on an enlarged scale in a circle of FIG. 1.

FIG. 1 shows a synthetic board 2 of a first embodiment according to the present invention. A part of the synthetic board 2 is schematically shown on an enlarged scale in a circle of FIG. 1.

The synthetic board 2 includes lignocellulosic material 4 containing lignocellulose and an adhesive 6 for binding the lignocellulosic material 4. The lignocellulosic material 4 is made from plants. For example, wood, bamboo, kenaf, hemp and the like may be used as raw materials of the lignocellulosic material 4. The lignocellulosic material 4 is in the form of fiber, powder or the like. The fibrous lignocellulosic material 4 is obtained, for example, by fiberizing a raw material through steam treatment, explosion treatment or machining by means of a fiberizer. The fibrous lignocellulosic material 4 may be taken out after immersing a raw material in a weak alkaline solution until texture thereof is dissolved. The lignocellulosic material 4 may be fiber fascicle that is easily fiberized. The fiber fascicle is obtained by subjecting the raw material to the steam or explosion treatment. The fiber fascicle can be further fiberized by using the fiberizer.

The steam treatment is carried out at high temperature, and the explosion treatment at high temperature and high pressure, which kills insects, mold, and bacteria in the raw material. Consequently, if the lignocellulosic material 4 obtained through the steam or explosion treatment is used, the synthetic board 2 is improved in preservability and durability.

The adhesive 6 is a polybutylene succinate-based resin. The polybutylene succinate-based resin is prepared from succinic acid and 1,4-butanediol. The succinic acid and the 1,4-butanediol can be produced from plant-derived raw material.

The polybutylene succinate-based resin used as the adhesive 6 is preferably subjected to anti-hydrolyzation and anti-biodegradation treatments. In other words, it is preferable that the polybutylene succinate-based resin used as the adhesive 6 have anti-hydrolyzability and anti-biodegradability. As the anti-hydrolyzation and anti-biodegradation treatments, for example, treatment such as end-capping is carried out with respect to the polybutylene succinate-based resin. Although a common polybutylene succinate-based resin has hydrolyzability and biodegradability, the anti-hydrolyzation and anti-biodegradation treatments suppress degradation of the polybutylene succinate-based resin and extend the life of the synthetic board 2. Especially, if the synthetic board 2 is applied to an interior member of a vehicle, a building component or the like, the life of the synthetic board 2 is prolonged.

More preferably, the anti-hydrolyzation and anti-biodegradation treatments are performed so that tensile fracture elongation of the polybutylene succinate-based resin that has undergone prescribed accelerated treatment is 80 percent or more of an initial value of tensile fracture elongation before the accelerated treatment in percentage terms.

Specifically, one of test pieces of the polybutylene succinate-based resin used as the adhesive 6 is directly provided to a tension test, and another test piece is provided to the tension test after undergoing the prescribed accelerated treatment. More preferably, the anti-hydrolyzation and anti-biodegradation treatments are performed so that, in the test results, ratio of Y to X, namely Y/X, is 80 percent or more when the value of tensile fracture elongation of the test piece that has not been subjected to the accelerated treatment, or initial value, is X, and the value of tensile fracture elongation of the test piece that has been subjected to the accelerated treatment is Y. In the prescribed accelerated treatment, the test pieces are let stand for 480 hours in an environment where temperature is 50 degrees centigrade, and relative humidity is 90 percent.

One example of a method of producing the synthetic board 2 will be described below.

First, the lignocellulosic material 4 and the adhesive 6 are mixed with each other. The polybutylene succinate-based resin is thermoplastic resin. When mixed with the lignocellulosic material 4, the polybutylene succinate-based resin may be in the form of fiber, powder, pellets, emulsion, solution, or the like.

As mixing means for mixing the lignocellulosic material 4 and the polybutylene succinate-based resin, a mixer, such as a kneader, a roll, and a biaxial extruder, or a spray or the like may be used. The fiber of the lignocellulosic material 4 and the fiber of the polybutylene succinate-based resin may be intertwined with each other by means of a fiberizer, a Garnett machine or the like. Additionally, the fiber of the lignocellulosic material 4 and the fiber of the polybutylene succinate-based resin may be molded in the shape of a voluminous mat by using a needle punch or the like. It is also possible to mold only the lignocellulosic material 4 in the shape of a voluminous mat and to sprinkle a solution of the polybutylene succinate-based resin on a surface thereof.

Subsequently, a mixture of the lignocellulosic material 4 and the polybutylene succinate-based resin are heat-pressed, to thereby mold the synthetic board 2.

The heat-pressing step is preferably constituted by first and second processes. To be more concrete, in the first process, the mixture of the lignocellulosic material 4 and the polybutylene succinate-based resin is compressed at prescribed temperature and pressure so that a board-like preform is obtained. Thereafter, the pressure applied on the preform is once released, and then the second process is carried out. In the second process, the preform is compressed at higher temperature and lower pressure than in the first process, to thereby obtain the synthetic board 2. As described above, in the second process, the temperature is changed from the temperature applied in the first process, and the preform is compressed at low pressure. By so doing, the obtained synthetic board 2 has a good appearance.

Figure 2:
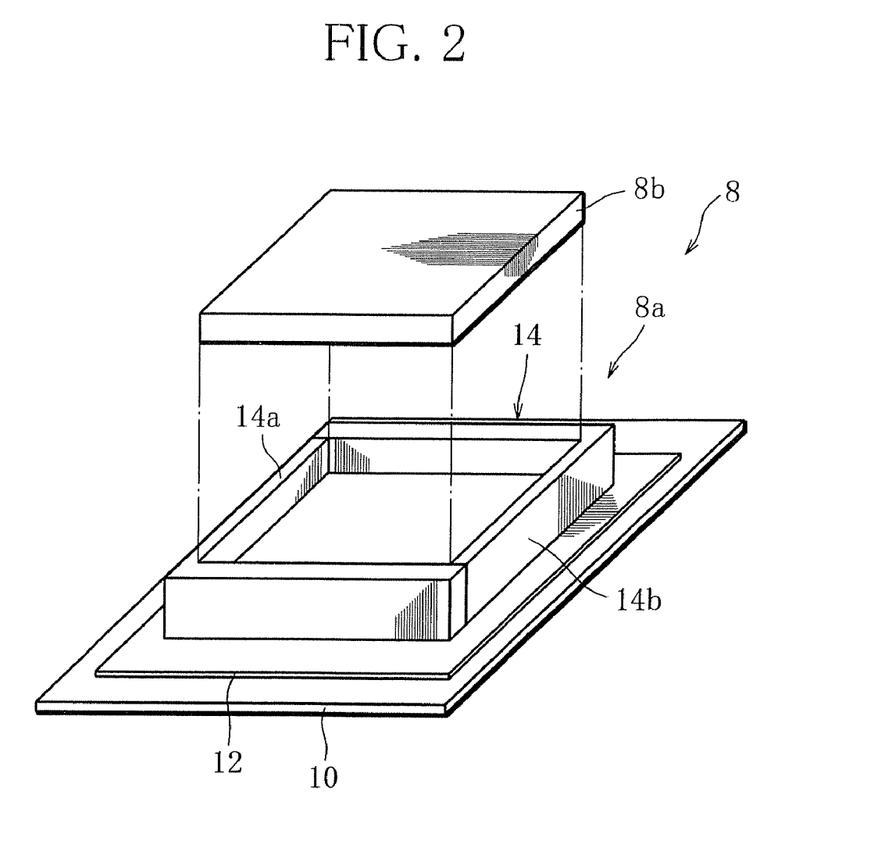
FIG. 2 is a perspective view showing a mold for producing a preform of the synthetic board of FIG. 1.

FIG. 2 shows as example a mold 8 that is used in the first process. A lower die 8a of the mold 8 has a stainless plate 10. A release sheet 12 is laid on the stainless plate 10. The release sheet 12 is made of glass-fiber-reinforced PTFE (polytetrafluoroethylene) resin. Disposed on the release sheet 12 is a square frame 14. The frame 14 is formed by assembling L-shaped frame members 14a and 14b.

The mold 8 includes an upper die 8b. The upper die 8b has a block-like shape that is slightly smaller than an opening of the frame 14.

Figure 3:
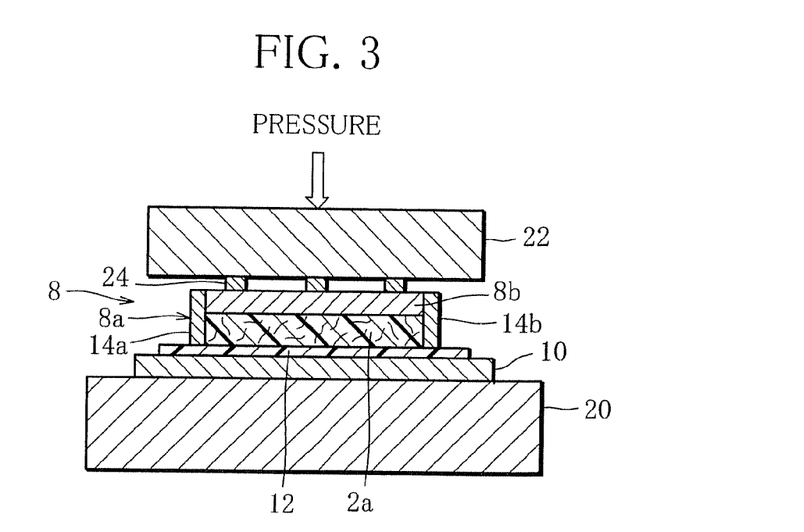
FIG. 3 is a sectional view for explaining the step of producing the preform by means of the mold shown in FIG. 2.

FIG. 3 shows the step of compressing a mixture filled into the frame 14 of the mold 8 to form a preform 2a. The mold 8 is positioned between a platen 20 and a ram 22 of a hydraulic pressing machine. Wood pieces 24 for height adjustment are arranged between the ram 22 and the upper die 8b.

As the ram 22 moves downward, the upper die 8b sinks into the frame 14. The mixture in the frame 14 is molded into the preform 2a by being compressed using the upper die 8b for a prescribed time period. Pressure used in this step is sufficient if the pressure is such that the shape of the obtained preform 2a is retained until the subsequent second process.

Figure 4:
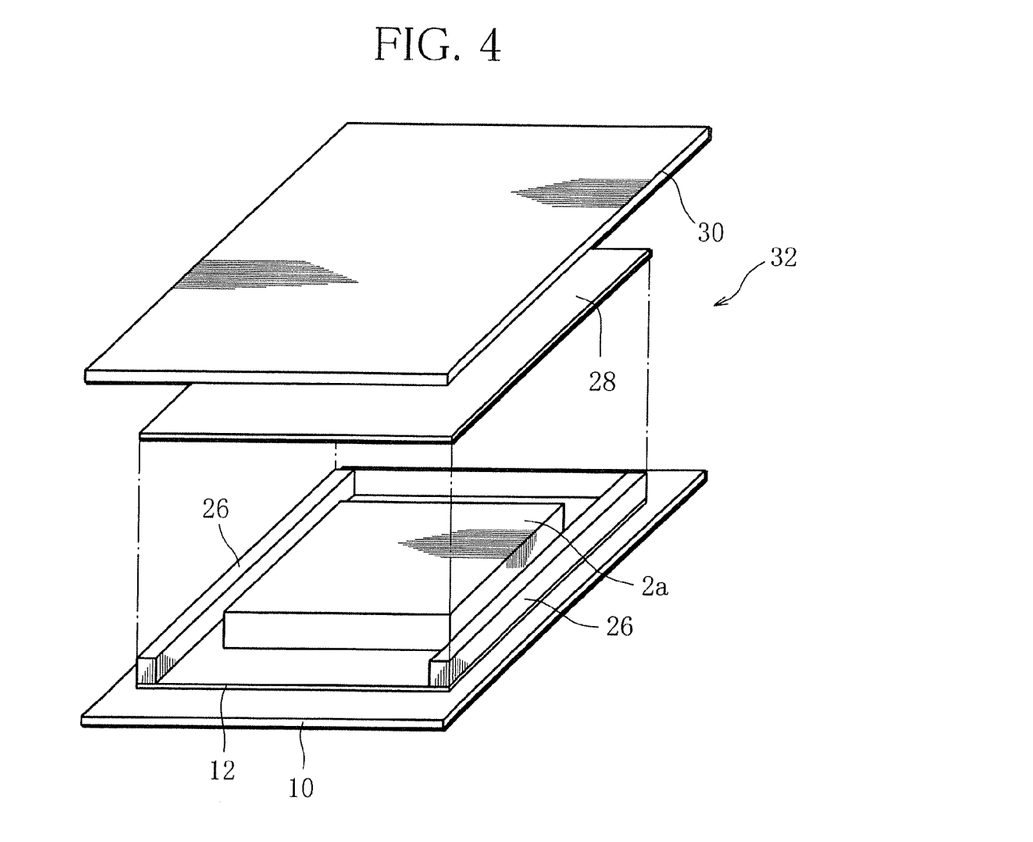
FIG. 4 is a perspective view showing a mold for molding the synthetic board together with the preform.

After the pressure is released, the mold 8 is removed from the hydraulic pressing machine, and the frame members 14a and 14b and the upper die 8b are detached from the mold 8. Consequently, as shown in FIG. 4, the preform 2a is left on the stainless plate 10 with the release sheet 12 interposed therebetween.

In order to carry out the second process next, spacers 26 are arranged at both sides of the preform 2a that has been left. Each of the spacers 26 has a block-like shape and is set away from a corresponding side edge of the preform 2a at given distance to be parallel with the side edge. A release sheet 28 and a stainless plate 30 are placed on the preform 2a. The release sheet 28 is also made of glass-fiber-reinforced PTFE resin and is placed between the preform 2a and the stainless plate 30. Accordingly, the stainless plates 10 and 30, the release sheets 12 and 28, and the spacers 26 construct a mold 32 for the second process in consort with each other.

Figure 5:
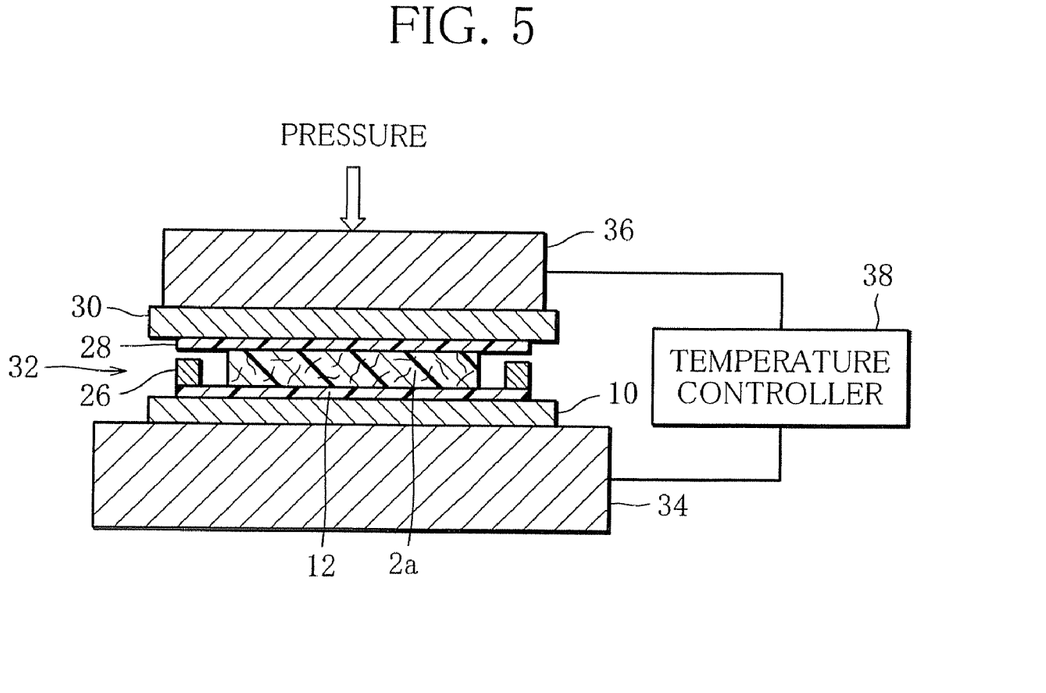
FIG. 5 is a sectional view for explaining the step of heat-pressing the preform and molding the synthetic board by means of the mold shown in FIG. 4.

As shown in FIG. 5, the mold 32 is set between a platen 34 and a ram 36 of another hydraulic pressing machine in a state of sandwiching the preform 2a. The hydraulic pressing machine has a temperature controller 38. Temperature of the platen 34 and the ram 36 is raised up to prescribed temperature by means of the temperature controller 38 before the mold 32 is set. By lowering the ram 36, the preform 2a is compressed at the prescribed temperature and pressure for a prescribed time period, and is molded into the synthetic board 2.

The synthetic board 2 is made up of the lignocellulosic material 4 containing lignocellulose and the adhesive 6 containing polybutylene succinate-based resin, thereby preventing the increase of a carbon dioxide amount, which is caused by incineration of the board 2 and the like. As a consequence, the synthetic board 2 is environmentally friendly. In addition, the adhesive 6 does not contain an organic solvent, free phenol and the like, so that the synthetic board 2 is human-friendly as well.

Furthermore, since the adhesive 6 contains the polybutylene succinate-based resin, the synthetic board 2 has sufficient flexibility and strength.

The present invention is not limited to the first embodiment, and may be modified in various ways.

Figure 6:
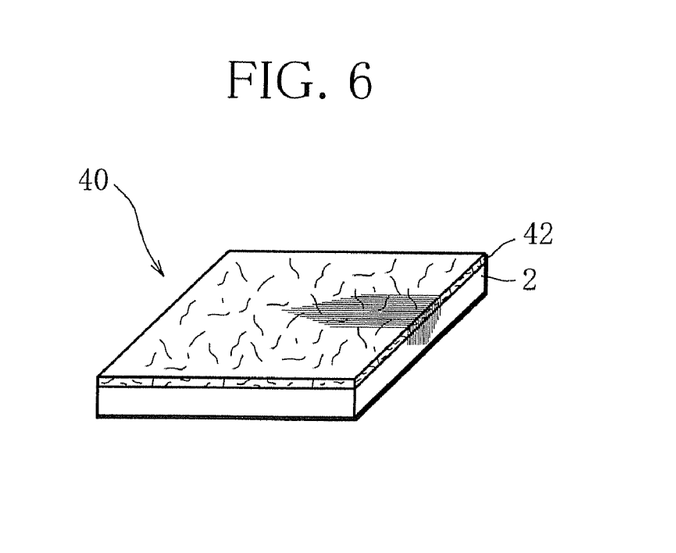
FIG. 6 is a perspective view of a woven or nonwoven fabric covered synthetic board of a second embodiment according to the present invention.

FIG. 6 shows a woven or nonwoven fabric covered synthetic board 40 of a second embodiment according to the present invention.

The woven or nonwoven fabric covered synthetic board 40 has a synthetic board 2 and a woven or nonwoven fabric 42 laminated onto at least one of surfaces of the synthetic board 2.

Although the woven or nonwoven fabric covered synthetic board 40 is not particularly limited, it is preferably produced in the following manner.

Figure 7:
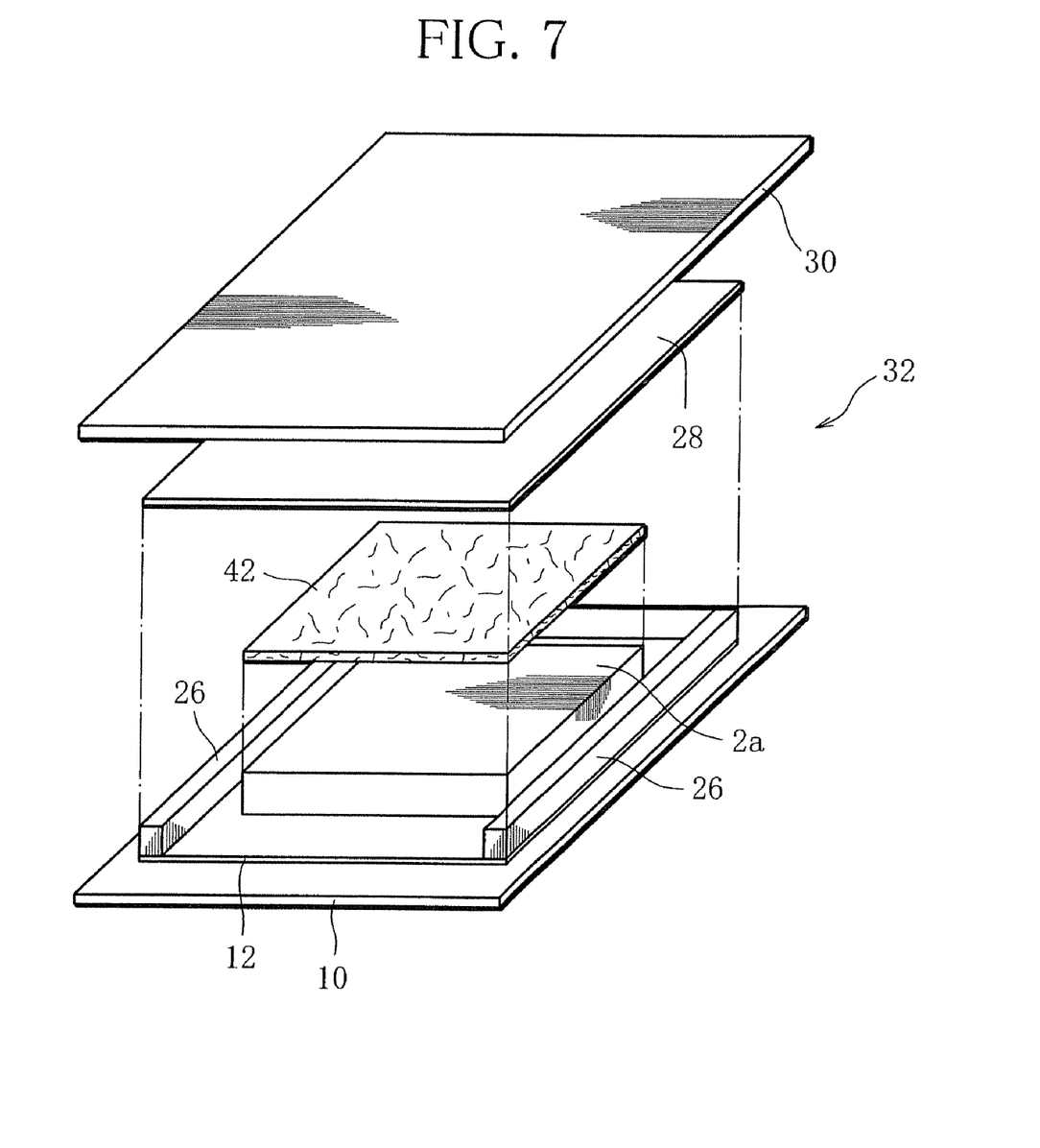
FIG. 7 is a perspective view showing the mold illustrated in FIG. 4 together with the preform and a woven or nonwoven fabric.

As shown in FIG. 7, when a release sheet 28 is superposed upon a preform 2a, the woven or nonwoven fabric 42 is placed between the preform 2a and the release sheet 28. Namely, the woven or nonwoven fabric 42 and the release sheet 28 is superposed upon the perform 2a in this order. In this case, in the same manner as in the first embodiment, a mold 32 sandwiching the preform 2a and the woven or nonwoven fabric 42 is compressed by the pressing machine with the temperature controller 38, to thereby laminate the woven or nonwoven fabric 42 onto the synthetic board 2 at the same time as the molding of the synthetic board 2. In other words, the adhesive 6 has not only a function of binding the lignocellulosic material 4 but also a function of bonding the woven or nonwoven fabric 42 to the lignocellulosic material 4. The molding of the synthetic board 2 and the lamination of the woven or nonwoven fabric 42 are simultaneously carried out in the same step.

This makes it possible to skip the step of applying an adhesive to the synthetic hoard 2 and to simplify the process of producing the woven or nonwoven fabric covered synthetic board 40. Consequently, the cost for producing the woven or nonwoven synthetic board 40 is reduced. Since the woven or nonwoven fabric 42 adheres to the synthetic board 2 with the polybutylene succinate-based resin, the woven or nonwoven fabric covered synthetic board 40 is environment- and human-friendly, and also has sufficient flexibility and strength.

In the case of the woven or nonwoven fabric covered synthetic board 40, too, if the preform 2a and the woven or nonwoven fabric 42 are compressed at low pressure in the second process, this suppresses the crushing of the woven or nonwoven fabric 42 and improves the appearance of the woven or nonwoven fabric covered synthetic board 40.

If the lignocellulosic material 4 is subjected to steam or explosion treatment, it is possible to mold the synthetic board 2 by binding the lignocellulosic material 4 by using a decomposition product as the adhesive 6, which is created by decomposition of hemicellulose and lignin. In this case, the woven or nonwoven fabric 42 may be laminated onto the synthetic board 2 through an adhering layer of polybutylene succinate-based resin, which is formed by applying or sprinkling a solution of polybutylene succinate-based resin onto the surface of the obtained synthetic board 2.

Although in the first and second embodiments, the heat-press molding is performed, the molding means is not particularly limited, and it is possible to use, for example, injection compression molding or the like.

According to the first and second embodiments, a mixing ratio of the lignocellulosic material 4 and the adhesive 6 is not particularly limited. It is preferable, however, that 100 parts by mass of the lignocellulosic material 4 be mixed with 5 to 300 parts by mass of the polybutylene succinate-based resin. This is because this mixing ratio makes it possible to obtain the synthetic board 2 having sufficient strength due to adhesion force of the adhesive 6 with the lignocellulosic material 4 functioning as a framework. Another reason is that, since the polybutylene succinate-based resin functions as an adhesive between the woven or nonwoven fabric 42 and the synthetic board 2, the woven or nonwoven fabric covered synthetic board 40 with sufficient strength can be provided.

EMBODIMENTS

Embodiment 1

As lignocellulosic material 4, bamboo fibers that had undergone an explosion treatment were used. Conditions of the explosion treatment were a pressure of 9 atm, a temperature of 180 degrees centigrade, and a duration of 20 minutes. The bamboo fibers had an average length of 200 mm.

40 grams of powder of polybutylene succinate-based resin that had been end-capped ("GS Pla" manufactured by Mitsubishi Chemical, grade: AZ71T, 2-mm mesh) was mixed with 120 grams of the bamboo fibers. A resulting mixture was filled in the mold 8. As shown in FIG. 3, the mold 8 was compressed by the hydraulic pressing machine at a pressure of 0.77 MPa for 5 minutes, to thereby produce the preform 2a from the mixture.

The spacer 26 having a thickness of 4 mm was disposed at each side of the obtained preform 2a as shown in FIG. 4. The release sheet 28 and the stainless plate 30 were superposed upon the preform 2a. Then, as shown in FIG. 5, the mold 32 was then set in the hydraulic pressing machine in which the platen 34 and the ram 36 had previously been heated up to 160 degrees centigrade. The preform 2a having an area of 19 cm×19 cm was heat-pressed at a load of 26 kN for 6 minutes, to thereby mold a synthetic board 2 of Embodiment 1 from the preform 2a.

Embodiment 2

70 grams of fibers of polybutylene succinate-based resin that had been end-capped ("GS Pla" manufactured by Mitsubishi Chemical, grade: AZ71T, 5 denier, 5 mm) was mixed with 90 grams of the bamboo fibers. A spacer with a thickness of 6 mm was used, and a platen 34 and a ram 36 were heated up to 140 degrees centigrade. Other than that, a synthetic board 2 of Embodiment 2 was molded in the same manner as in Embodiment 1.

Embodiment 3

As lignocellulosic material 4, beech flour that had undergone a steam treatment was used. Conditions of the steam treatment were a temperature of 200 degrees centigrade, and a duration of 20 minutes. The beech flour had passed through a 2-mm mesh.

40 grams of powder of polybutylene succinate-based resin that had been end-capped ("GS Pla" manufactured by Mitsubishi Chemical, grade: AZ71T, 2-mm mesh) was mixed with 120 grams of the beech flour. A resulting mixture was filled in a mold 8. As shown in FIG. 3, the mold 8 was compressed by a hydraulic pressing machine at a pressure of 0.77 MPa for 5 minutes, to thereby produce a preform 2a from the mixture.

The spacer 26 having a thickness of 4 mm was disposed at each side of the obtained preform 2a as shown in FIG. 4. A release sheet 28 and a stainless sheet 30 were superposed upon the preform 2a. Subsequently, as shown in FIG. 5, a mold 32 was set in another hydraulic pressing machine in which a platen 34 and a ram 36 had been previously heated up to 180 degrees centigrade. The preform 2a having an area of 19 square cm was heat-pressed at a load of 106 kN for 10 minutes, to thereby mold a synthetic board 2 of Embodiment 3 from the preform 2a.

Embodiment 4

When the compression was carried out by means of a mold 32, a nonwoven fabric made of PET (polyethylene terephthalate) was superposed upon a preform 2a as a nonwoven fabric 42. Other than that, a nonwoven fabric covered synthetic board 40 of Embodiment 4 was molded in the same manner as in Embodiment 1.

Embodiment 5

When the compression was carried out by means of a mold 32, a nonwoven fabric made of PET was superposed upon a preform 2a as a nonwoven fabric 42. Other than that, a nonwoven fabric covered synthetic board 40 of Embodiment 5 was molded in the same manner as in Embodiment 2.

Embodiment 6

When the compression was carried out by means of a mold 32, a nonwoven fabric made of PET is superposed upon a preform 2a as a nonwoven fabric 42. Other than that, a nonwoven fabric covered synthetic board 40 of Embodiment 6 was molded in the same manner as in Embodiment 3.

Comparative Example 1

As a well-known synthetic board, a synthetic board that had been obtained by molding a mixture of phenol resin and woodchip was prepared.

Comparative Example 2

A chloroprene rubber-based solvent adhesive was applied to the well-known synthetic board of Comparative Example 1. A nonwoven fabric made of PET was laid on the surface applied with the adhesive, and the nonwoven fabric and the synthetic board were compressed at a pressure of 0.1 MPa for 24 hours, to thereby produce a nonwoven fabric covered synthetic board of Comparative Example 2.

Test pieces for property measurement were cut out from the synthetic boards or nonwoven fabric covered synthetic boards of Embodiments 1 to 6 and Comparative Examples 1 and 2. For example, a bending-test piece has a size of 148 mm×50 mm×3.65 mm, and a water-absorption test piece has a size of 50 mm×50 mm×3.65 mm. Each of the test pieces underwent tests on a volatile amount of TVOC (Total Volatile Organic Compounds), a volatile amount of aldehyde, three-dimensional moldability, water absorption, and bending strength. With respect to the nonwoven fabric covered synthetic boards of Embodiments 4 to 6 and Comparative Example 2, a test on adhesion property of the nonwoven fabric was also conducted. Results thereof are shown in FIGS. 8 and 9.

Figure 8:
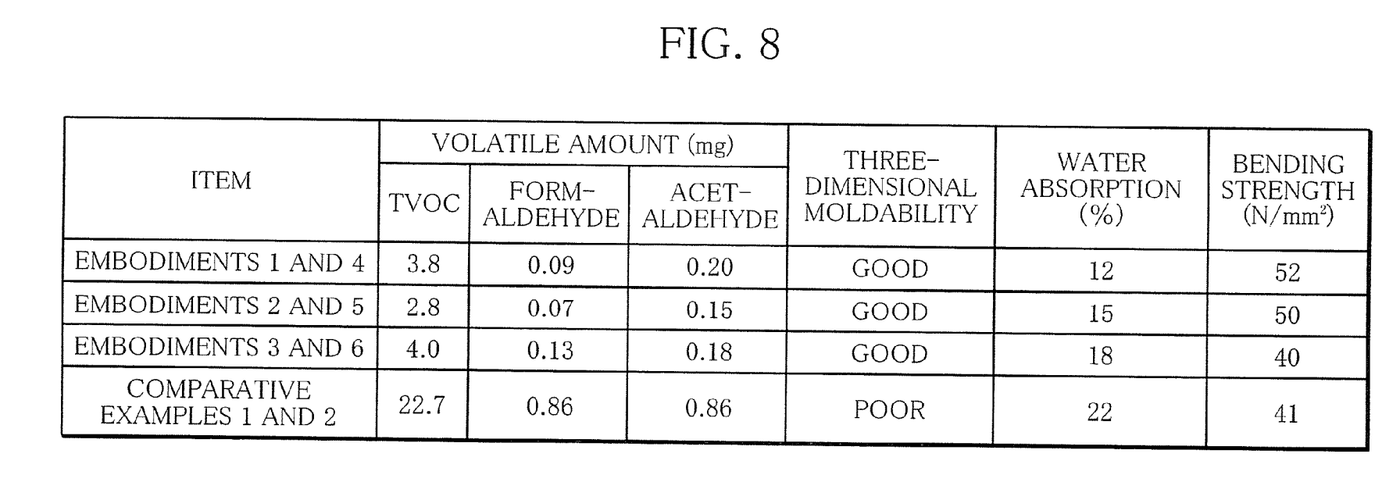
FIG. 8 is a table showing results of a property test on synthetic boards of Embodiments 1 to 6 and Comparative Examples 1 and 2.
Figure 9:
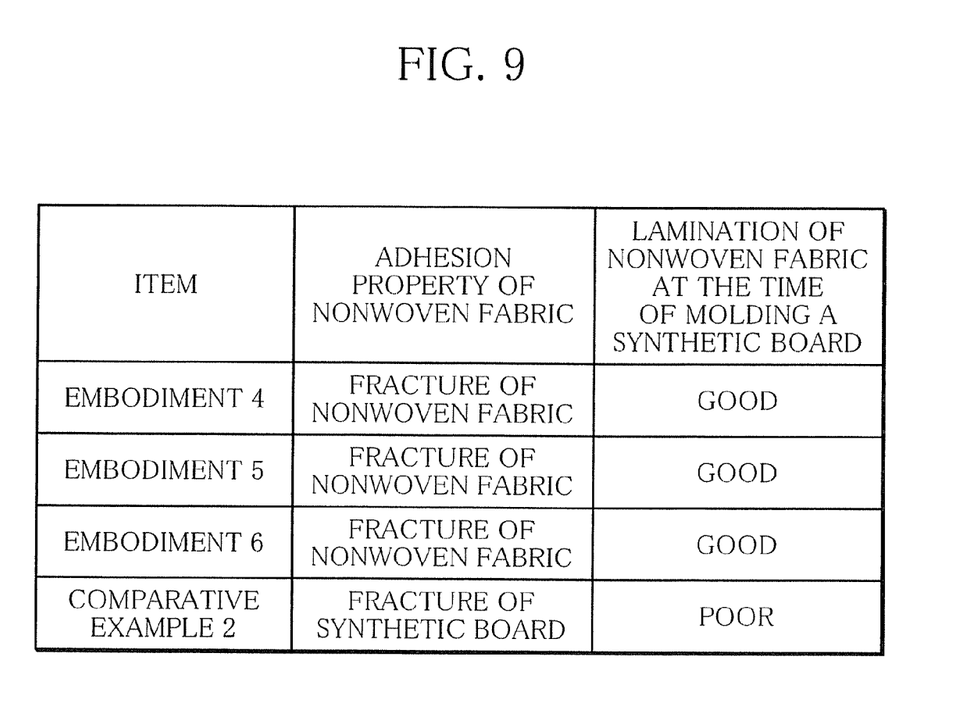
FIG. 9 is a table showing results of an adhesion property on woven or nonwoven fabrics with respect to woven or nonwoven fabric covered synthetic boards of Embodiments 4 to 6 and Comparative Example 2.

As shown in FIG. 8, according to Embodiments 1 to 6, the volatile amounts of TVOC and aldehyde are smaller than those in Comparative Examples 1 and 2. This result shows that the synthetic boards or nonwoven fabric covered synthetic boards of Embodiments 1 to 6 have small effect on the human body.

The volatile amounts of TVOC, formaldehyde, and acetaldehyde shown in FIG. 8 were measured in the following manner. First, a test piece having a size of 19 cm×19 cm×0.4-0.6 cm was put into a container with 15 liter of pure air, and the container was sealed. After the container was let stand at a temperature of 65 degrees centigrade for 2 hours, the air in the container was collected by prescribed amount. The TVOC, formaldehyde and acetaldehyde contained in the collected air were measured in terms of mass. The volatile amounts shown in FIG. 8 were obtained by converting the measurement results into the masses of the TVOC, formaldehyde and acetaldehyde contained in 1 cubic meter of air.

As shown in FIG. 8, the three-dimensional moldability is good in Embodiments 1 to 6, whereas it is not good in Comparative Examples 1 and 2. This result shows that the synthetic boards or nonwoven fabric covered synthetic boards of Embodiments 1 to 6 can be freely molded in terms of shape.

As shown in FIG. 8, in Embodiments 1 to 6, the water absorption is sufficiently low, and the bending strength is great, as compared to Comparative Examples 1 and 2. Therefore, the synthetic boards or nonwoven fabric covered synthetic boards of Embodiments 1 to 6 are suitable for interior members of a vehicle and building components.

As is apparent from the test results, the synthetic boards and the woven or nonwoven fabric covered synthetic boards according to the present invention are lower in moisture absorption and higher in durability than conventional synthetic boards or woven or nonwoven fabric covered synthetic boards, so that they are suitable for use in a vehicle or the like.

In the adhesion property test on nonwoven fabrics, the laminated nonwoven fabrics were peeled off from the respective synthetic boards. As shown in FIG. 9, the nonwoven fabrics were torn in Embodiments 4 to 6, and the synthetic board was broken in Comparative Example 2. It can be said then that, in Embodiments 4 to 6, adhesion force between each of the synthetic boards and the corresponding nonwoven fabric is high enough, and the strength of the synthetic boards is sufficiently secured.

As shown in FIG. 9, according to Embodiments 4 to 6, it is possible to laminate the woven or nonwoven fabrics simultaneously with the molding of the synthetic boards. In Comparative Examples, however, the woven or nonwoven fabrics cannot be laminated at the same time with the molding of the synthetic boards.

Descriptions of the embodiments of the synthetic board according to the present invention will be finished here, but embodiments are not limited to the above-mentioned ones.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synthetic board comprising:
   one of fiberized lignocellulosic material and powdered lignocellulosic material;
   an adhesive for binding said lignocellulosic material, the adhesive containing polybutylene succinate-based resin; and
   one of a woven fabric and a nonwoven fabric laminated onto one side of a mixture of said lignocellulosic material and said adhesive simultaneously when the mixture is subjected to heat-press molding.

2. A synthetic board comprising:
   one of fiberized lignocellulosic material and powdered lignocellulosic material;
   an adhesive for binding said lignocellulosic material, the adhesive containing polybutylene succinate-based resin, wherein
   said polybutylene succinate-based resin is treated to suppress hydrolyzability and biodegradability.

3. The synthetic board according to claim 2, wherein:
   when an initial value of tensile fracture elongation of said polybutylene succinate-based resin is X, and
   a value of tensile fracture elongation of said polybutylene succinate-based resin that has been let stand for 480 hours in an environment where temperature is 50 degrees centigrade, and
   relative humidity is 90 percent, is Y, ratio of Y to X is 80 percent or more.

4. A synthetic board comprising:
   one of fiberized lignocellulosic material and powdered lignocellulosic material;
   an adhesive for binding said lignocellulosic material, the adhesive containing polybutylene succinate-based resin, wherein
   said lignocellulosic material is fibers mechanically fiberized by a fiberizer.

5. A synthetic board comprising:
   one of fiberized lignocellulosic material and powdered lignocellulosic material;
   an adhesive for binding said lignocellulosic material, the adhesive containing polybutylene succinate-based resin, wherein
   said synthetic board contains said polybutylene succinate-based resin in a range of 5 to 300 parts by mass when said synthetic board contains 100 parts by mass of said lignocellulosic material.

6. A method of producing a synthetic board comprising the steps of:
   obtaining a mixed material by mixing lignocellulosic material containing lignocellulose and an adhesive containing polybutylene succinate-based resin;
   heating and pressing said mixed material at the same time;
   molding a board-like preform from said mixture between said mixing step and said pressing step; and
   setting one of a woven fabric and a nonwoven fabric onto a surface of said preform, wherein:
   said pressing step simultaneously heats and presses said preform together with said fabric.

7. A method of producing a synthetic board comprising the steps of:
   obtaining a mixed material by mixing lignocellulosic material containing lignocellulose and an adhesive containing polybutylene succinate-based resin;
   heating and pressing said mixed material at the same time; and
   treating said polybutylene succinate-based resin to suppress hydrolyzability and biodegradability prior to said mixing step.

8. The method according to claim 7, wherein:
   said treating step is carried out so that, when an initial value of tensile fracture elongation of said polybutylene succinate-based resin is X, and a value of tensile fracture elongation of said polybutylene succinatebased resin that has previously been let stand for 480 hours in an environment where temperature is 50 degrees centigrade, and relative humidity is 90 percent, is Y, ratio of Y to X is 80 percent or more.

9. A method of producing a synthetic board comprising the steps of:
   obtaining a mixed material by mixing lignocellulosic material containing lignocellulose and an adhesive containing polybutylene succinate-based resin;
   heating and pressing said mixed material at the same time; and
   fiberizing a raw material containing lignocellulose to obtain fibers as said lignocellulosic material prior to said mixing step, said fiberizing step including a process of subjecting said raw material to an explosion treatment.

10. A method of producing a synthetic board comprising the steps of:
    obtaining a mixed material by mixing lignocellulosic material containing lignocellulose and an adhesive containing polybutylene succinate-based resin;
    heating and pressing said mixed material at the same time; and
    fiberizing a raw material containing lignocellulose to obtain fibers as said lignocellulosic material prior to said mixing step, wherein:
    said fiberizing step mechanically fibrillates said raw material by using a fiberizer.

11. A method of producing a synthetic board comprising the steps of:
    obtaining a mixed material by mixing lignocellulosic material containing lignocellulose and an adhesive containing polybutylene succinate-based resin; and
    heating and pressing said mixed material at the same time, wherein
    said mixing step mixes 5 parts to 300 parts by mass of said polybutylene succinate-based resin with 100 parts by mass of said lignocellulosic material.

* * * * *